US012792159B1

(12) United States Patent
Shi

(10) Patent No.: US 12,792,159 B1
(45) Date of Patent: Nov. 10, 2026

(54) INTERACTION METHOD OF SMART RING AND INTERACTION SYSTEM THEREOF, STORAGE MEDIUM, COMPUTER PROGRAM PRODUCT

(71) Applicant: KiWear, Inc., Dover, DE (US)

(72) Inventor: Chi Shi, Shanghai (CN)

(73) Assignee: KiWear, Inc, Dover, DE (US)

( * ) Notice: Subject to any disclaimer, the term of this patent is extended or adjusted under 35 U.S.C. 154(b) by 0 days.

(21) Appl. No.: 19/279,772

(22) Filed: Jul. 24, 2025

(30) Foreign Application Priority Data

Jun. 9, 2025 (CN) ........................ 202510766331.4

(51) Int. Cl.

| | |
|---|---|
| ***G06F 3/01*** | (2006.01) |
| ***G06F 1/16*** | (2006.01) |
| ***G06F 3/0346*** | (2013.01) |
| ***G06T 7/70*** | (2017.01) |
| *G06F 3/0482* | (2013.01) |

(52) U.S. Cl.
CPC ............ *G06F 3/0346* (2013.01); *G06F 1/163* (2013.01); *G06F 3/0482* (2013.01)

(58) Field of Classification Search
CPC .... G06F 2218/10; G06F 3/017; G06F 3/0346; G06F 3/011
See application file for complete search history.

(56) References Cited

U.S. PATENT DOCUMENTS

| | | | | |
|---|---|---|---|---|
| 9,582,076 | B2 * | 2/2017 | Kienzle | G06F 3/017 |
| 2017/0272842 | A1 * | 9/2017 | Touma | A63B 24/0003 |
| 2024/0012479 | A1 * | 1/2024 | Qiu | G06F 3/016 |
| 2024/0220015 | A1 * | 7/2024 | Tsai | G06T 7/70 |
| 2025/0036206 | A1 * | 1/2025 | Brewer | G06F 3/013 |
| 2026/0003493 | A1 * | 1/2026 | Yao | G06F 3/013 |

* cited by examiner

*Primary Examiner* — Nan-Ying Yang
(74) *Attorney, Agent, or Firm* — Schwegm5an Lundberg & Woessner, P.A.

(57) ABSTRACT

An interaction method of a smart ring, interaction system, storage medium and the computer program product thereof, wherein the method includes: acquiring inertial measurement data of the smart ring in real time; judging whether the rotation motion of the smart ring is an effective rotation motion or not based on the inertia measurement data; and if the rotation motion of the smart ring is effective rotation motion, triggering an interaction event. whether the rotation motion through judging the intelligence ring triggers the interaction event for effective rotation motion, can save and set up the physics button on the surface of intelligence ring, the outward appearance uniformity of intelligence ring has been improved, and simultaneously, whether the rotation motion through judging the intelligence ring is effective rotation motion, trigger the interaction event, can reduce the probability that the intelligence ring spurious triggering.

12 Claims, 1 Drawing Sheet

INTERACTION METHOD OF SMART RING AND INTERACTION SYSTEM THEREOF, STORAGE MEDIUM, COMPUTER PROGRAM PRODUCT

CROSS-REFERENCE TO RELATED APPLICATIONS

This application claims the priority to Chinese Patent Application 202510766331.4, filed on Jun. 9, 2025, the entire disclosure of which is incorporated herein by reference.

TECHNICAL FIELD

Some embodiments of the disclosure relates to the technical field of intelligent wearing, in particular to an interaction method of smart ring and interaction system thereof, storage medium, computer program product.

BACKGROUND

With the rapid rise of the intelligent wearable device market in recent years, the smart ring is attracting the technological fashion trend with its unique advantages as a new product which is attracting attention in this field. The smart ring breaks through the physical limitation of the traditional ring through continuous miniaturization design, realizes the obvious reduction of the volume, and the smart ring is almost not perceived when being worn, thereby bringing unprecedented portable experience for users. Meanwhile, with the continuous progress of the technology, the smart ring is increasingly rich in types, simple motion tracking to complex biological recognition and single function realization to multifunctional comprehensive application meet the diversified requirements of different user groups. The diversification is embodied not only in function, but also in appearance design and material selection, so that the smart ring can adapt to various occasions and personalized styles of users.

In the aspect of user experience, the optimization and promotion of the smart ring are particularly remarkable. Traditional intelligent wearing equipment has been solved to its small and exquisite volume and light weight and has worn uncomfortable problem, lets the user can comfortably wear for a long time. In addition, the convenience in operation and the functional practicability of the smart ring are greatly enhanced, and a user can easily use various intelligent functions such as health monitoring, message reminding, mobile payment and the like without complex setting and complex operation. The convenient use mode and rich function experience enable the smart ring to play more and more important roles in daily life and become an important component of digital life of people.

At present, the performance of the intelligent finger ring still needs to be improved.

SUMMARY

Some embodiments of the disclosure provide an interaction method of smart ring and interaction system thereof, storage medium, computer program product, so as to improves the performance of the smart ring.

In order to solve the above problem, some embodiments of the present disclosure provide an interaction method for a smart ring, comprises: acquiring inertial measurement data of the smart ring in real time; judging whether the rotation motion of the smart ring is an effective rotation motion or not based on the inertia measurement data; and if the rotation motion of the smart ring is effective rotation motion, triggering an interaction event.

Optionally, the step of judging whether the rotation motion of the smart ring is a valid rotation motion includes: based on the inertial measurement data, acquiring a rotation motion center, a rotation motion radius and a rotation motion direction of the smart ring; and judging whether the rotation motion of the smart ring is an effective rotation motion or not based on the rotation motion center, the rotation motion radius and the rotation motion direction.

Optionally, the step of judging whether the rotation motion of the smart ring is an effective rotation motion based on the rotation motion center, the rotation motion radius, and the rotation motion direction includes: comparing the rotation motion center with the three-dimensional center of the smart ring under rotation motion, comparing the rotation motion radius with the radius of the smart ring, and comparing the rotation motion direction with the tangential direction of the outer wall of the smart ring; if a rotation motion center is consistent with the three-dimensional center of the smart ring under the rotating motion, the rotation motion radius is consistent with the radius of the smart ring, and the rotating motion direction is consistent with the tangential direction of the outer wall of the smart ring, the rotating motion of the smart ring is determined to be effective motion.

Optionally, the step of judging whether the rotation motion of the smart ring is a valid rotation motion includes: transmitting the inertia measurement data to a deep learning network model, wherein the deep learning network model has specific data of effective rotation action; performing feature matching on the inertia measurement data and the specific data; and if the feature similarity of the inertia measurement data and the specific data is high, judging that the rotation motion is effective rotation motion.

Optionally, the deep learning network model includes one or more of a recurrent neural network, a long-short term memory network, and a convolutional neural network.

Optionally, the rotation motion comprises rotation of the smart ring in a single direction.

Optionally, the single direction includes a clockwise direction or a counterclockwise direction.

Optionally, the interaction event includes switching and controlling a menu item, switching and controlling a function item, or switching and controlling an operation interface.

Optionally, the smart ring has an inertia measurement element; the step of acquiring the inertial measurement data of the smart ring in real time comprises the following steps; and acquiring inertia measurement data of the smart ring based on the inertia measurement element.

Optionally, the inertial measurement data includes three-axis attitude angle information, angular rate information, and acceleration information.

Optionally, the inertial measurement element includes an acceleration sensor and a gyroscope.

Optionally, the interaction method of a smart ring can coexist with gesture interaction and key press interaction.

Correspondingly, some embodiments of the disclosure further provide a storage medium, storing one or more computer instructions, the one or more computer instructions comprises: acquiring inertial measurement data of the smart ring in real time; judging whether the rotation motion of the smart ring is an effective rotation motion or not based on the inertia measurement data; and, if the rotation motion of the smart ring is an effective rotation motion, triggering an interaction event.

Optionally, the step of judging whether the rotational motion of the smart ring is an effective rotation motion comprises: based on the inertia measurement data, acquiring a rotation motion center, a rotation motion radius and a rotation motion direction of the smart ring; judging whether the rotation motion of the smart ring is an effective rotation motion or not based on the rotation motion center, the rotation motion radius and the rotation motion direction.

Optionally, the step of judging whether the rotational motion of the smart ring is an effective rotation motion comprises: transmitting the inertial measurement data to a deep learning network model having data specific to effective rotation motion; performing feature matching on the inertial measurement data and the specific data; and if the feature similarity of the inertia measurement data and the specific data is high, judging that the rotation motion is an effective rotation motion.

Optionally, the rotation motion comprises rotation of the smart ring in a single direction.

Optionally, the interactive event includes switching and controlling of menu items, switching and controlling of function items, or switching and controlling of operation interfaces.

Correspondingly, some embodiments of the disclosure also provide a computer program product, comprising computer instructions, wherein the computer instructions comprises: acquiring inertial measurement data of the smart ring in real time; judging whether the rotation motion of the smart ring is an effective rotation motion or not based on the inertia measurement data; and, if the rotation motion of the smart ring is an effective rotation motion, triggering an interaction event.

Optionally, the step of judging whether the rotational motion of the smart ring is an effective rotation motion comprises: based on the inertia measurement data, acquiring a rotation motion center, a rotation motion radius and a rotation motion direction of the smart ring; judging whether the rotation motion of the smart ring is an effective rotation motion or not based on the rotation motion center, the rotation motion radius and the rotation motion direction.

Optionally, the step of judging whether the rotational motion of the smart ring is an effective rotation motion comprises: transmitting the inertial measurement data to a deep learning network model having data specific to effective rotation motion; performing feature matching on the inertial measurement data and the specific data; and if the feature similarity of the inertia measurement data and the specific data is high, judging that the rotation motion is an effective rotation motion.

Compared with the prior art, the technical scheme of some embodiments of the disclosure has the following advantages:

the interaction method of the smart ring provided by some embodiments of the disclosure judges whether the rotation motion of the smart ring is an effective rotation motion or not by acquiring the inertia measurement data of the smart ring in real time, and triggers an interaction event if the rotation motion of the smart ring is the effective rotation motion, compared with the existing scheme of interaction by a gesture mode or a physical key mode, the physical key mode can affect the appearance consistency of the smart ring, the interaction event is triggered by judging whether the rotation motion of the smart ring is the effective rotation motion or not, a physical key can be omitted on the surface of the smart ring, the appearance consistency of the smart ring is improved, meanwhile, the risk of false triggering is increased by the gesture mode or the physical key mode, the interaction event is triggered by judging whether the rotation motion of the smart ring is the effective rotation motion, and the probability of false triggering of the smart ring can be reduced, the experience of the user when using the smart ring is improved, and therefore the performance of the smart ring is improved.

DETAILED DESCRIPTION

At present, the smart ring realizes product interaction through gesture interaction or physical key, but the gesture interaction or physical key interaction all needs to wear the smart ring according to correct direction and angle, otherwise, operation is not convenient, and simultaneously, the gesture interaction or physical key interaction also increases the probability of smart ring false triggering, and influences the performance of the smart ring.

In order to solve the technical problem, some embodiments of the present disclosure provide an interaction method for a smart ring.

Figure 1:
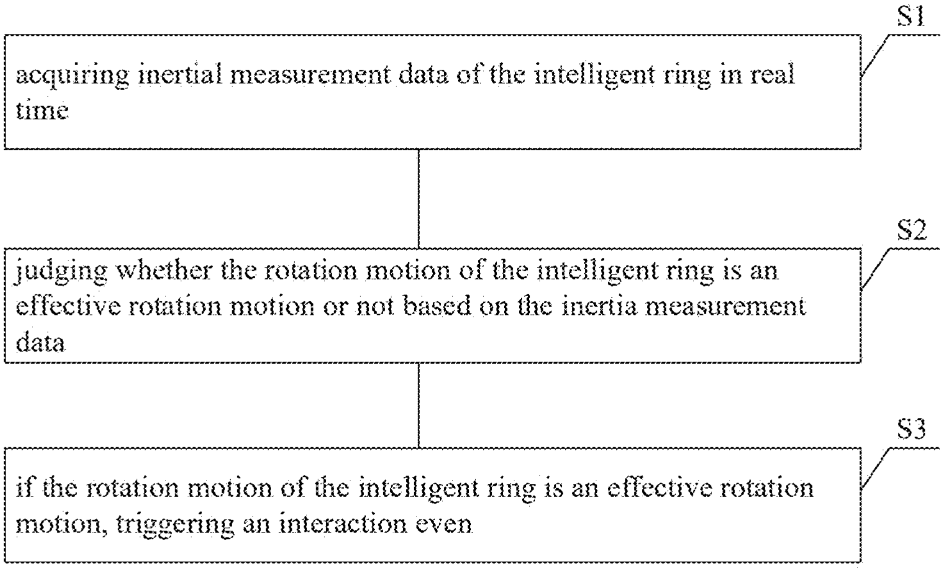
FIG. 1 is a flowchart of an embodiment of an interaction method of a smart ring according to the present disclosure.

Referring to FIG. 1, a flowchart of an embodiment of an interaction method of the smart ring of the present disclosure is shown.

In some embodiment, the method for interacting the smart ring includes the following basic steps:

- step S1: acquiring inertial measurement data of the smart ring in real time;
- step S2: judging whether the rotation motion of the smart ring is an effective rotation motion or not based on the inertia measurement data;
- step S3; and if the rotation motion of the smart ring is effective rotation motion, triggering an interaction event.

The interaction method of the smart ring provided by the embodiment of the disclosure judges whether the rotation motion of the smart ring is an effective rotation motion or not by acquiring the inertia measurement data of the smart ring in real time, and triggers an interaction event if the rotation motion of the smart ring is the effective rotation motion, compared with the existing scheme of interaction by a gesture mode or a physical key mode, the physical key mode can affect the appearance consistency of the smart ring, the interaction event is triggered by judging whether the rotation motion of the smart ring is the effective rotation motion or not, a physical key can be omitted on the surface of the smart ring, the appearance consistency of the smart ring is improved, meanwhile, the risk of false triggering is increased by the gesture mode or the physical key mode, the interaction event is triggered by judging whether the rotation motion of the smart ring is the effective rotation motion, and the probability of false triggering of the smart ring can be reduced, the experience of the user when using the smart ring is improved, and therefore the performance of the smart ring is improved.

In order to make the aforementioned objects, features and advantages of the embodiments of the present disclosure more comprehensible, specific embodiments of the present disclosure are described in detail below with reference to the accompanying drawings.

Figure 2:
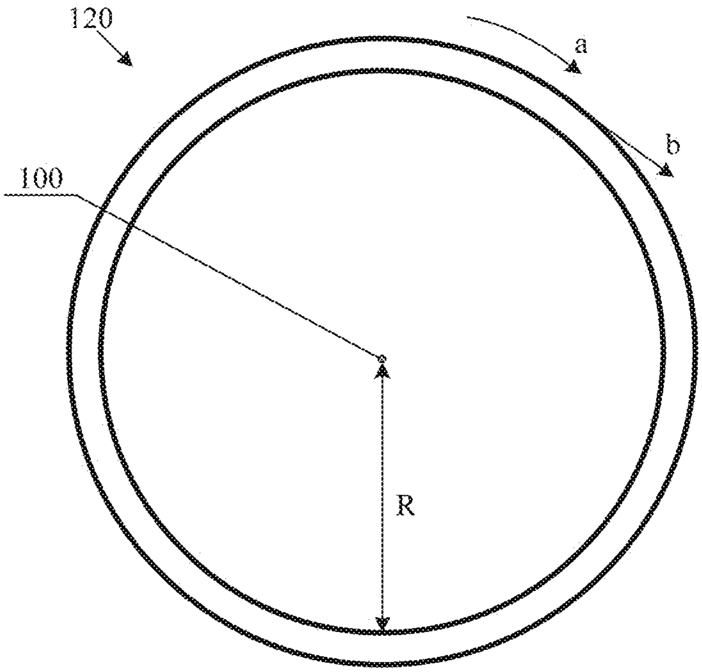
FIG. 2 is a schematic diagram corresponding to each step in an interaction method of the smart ring according to the present disclosure.

FIG. 2 is a schematic diagram corresponding to each step in an interaction method of the smart ring according to the present disclosure.

Referring to FIG. 2, step S1; and acquiring inertial measurement data of the smart ring 120 in real time.

Specifically, by acquiring the inertia measurement data of the smart ring 120 in real time, a data basis is provided for subsequently judging the validity of the rotational motion.

In some embodiment, the smart ring 120 has an inertial measurement element.

It should be noted that the inertial measurement element can obtain position data of the smart ring 120 in the rotation motion according to the three-axis attitude angle information, the angular rate information, and the acceleration information.

As an example, the inertial measurement element includes an acceleration sensor and a gyroscope.

It should be noted that the acceleration sensor is mainly used for measuring acceleration changes of the smart ring 120 in three axial directions, so as to obtain acceleration information; the gyroscope is used for measuring the angular velocity changes in three axial directions to further acquire attitude angle information and angular rate information, and the two information form an inertia measurement element together, so that various motion states of the smart ring 120 can be comprehensively and accurately sensed, and accurate data basis is provided for motion analysis and attitude judgment.

In some embodiment, the step of obtaining the inertia measurement data of the smart ring 120 in real time includes; and acquiring inertia measurement data of the smart ring 120 based on the inertia measurement element.

In some embodiment, the inertial measurement data includes three-axis attitude angle information, angular rate information, and acceleration information.

Referring to FIG. 2, step S2: based on the inertial measurement data, it is determined whether the rotational motion of the smart ring 120 is an effective rotation motion.

Specifically, compared with the scheme of performing interaction in a gesture mode or a physical key mode, the physical key mode may affect the appearance consistency of the smart ring 120, and an interaction event is triggered by judging whether the rotation motion of the smart ring 120 is an effective rotation motion, which can save setting a physical key on the surface of the smart ring 120, improve the appearance consistency of the smart ring 120, and meanwhile, the gesture mode or the physical key mode increases the risk of false triggering, In some embodiment, whether the rotation motion of the smart ring 120 is an effective rotation motion is judged, and an interaction event is triggered, which can reduce the probability of false triggering of the smart ring 120, and improve the experience of the user when using the smart ring 120, thereby improving the performance of the smart ring 120.

As an example, it is determined whether the rotation motion of the smart ring 120 is a valid rotation motion through kinematics calculation.

In some embodiment, the step of judging whether the rotation motion of the smart ring 120 is an effective rotation motion includes: based on the inertial measurement data, acquiring a rotational motion center, a rotational motion radius and a rotational motion direction a of the smart ring 120; based on the rotation motion center, the rotation motion radius, and the rotation motion direction a, it is determined whether the rotation motion of the smart ring 120 is an effective rotation motion.

It should be noted that the center of rotation, the radius of rotation, and the direction a of rotation can reveal the characteristics and properties of the rotation, and by obtaining the center of rotation, it can be determined whether the rotation is performed around the stereoscopic center 100 of the smart ring 120 itself, which helps to distinguish the natural rotation and other invalid rotation or movement when the user wears the smart ring 120 and rotates the smart ring 120.

It should also be noted that by obtaining the radius of the rotation motion, it is helpful to eliminate abnormal rotation caused by finger shaking or other ineffective actions.

In particular, the direction of rotation motion a provides key information about the user's intention, allowing different interaction commands to be performed according to different rotational directions.

As an example, the step of judging whether the rotational motion of the smart ring 120 is an effective rotation motion based on a rotation motion center, a rotation motion radius, and the rotation motion direction a includes: comparing a rotation motion center with the three-dimensional center 100 of the smart ring 120 under the rotational motion, comparing a rotation motion radius with the radius R of the smart ring 120, and comparing the rotation motion direction a with the tangential direction b of the outer wall of the smart ring 120; if a rotation motion center is consistent with the three-dimensional center 100 of the smart ring 120 under the rotational motion, a rotation motion radius is consistent with the radius of the smart ring 120, and the rotation motion direction a is consistent with the tangential direction b of the outer wall of the smart ring 120, the rotational motion of the smart ring 120 is determined as the effective motion.

It should be noted that, the center of rotational motion is consistent with the stereoscopic center 100 of the smart ring 120 under rotational motion, which ensures that the rotational motion is performed around the center of the smart ring 120 itself, rather than a deviated or skewed rotation, and the radius of rotational motion is consistent with the radius R of the smart ring 120, which ensures that the rotational motion is performed within an expected range, rather than an excessive swing or an insufficient twist, and meanwhile, the direction a of rotational motion is consistent with the tangential direction b of the outer wall of the smart ring 120, so that the rotational motion is performed along a natural trajectory of the outer wall of the smart ring 120, rather than a chaotic shake, thereby recognizing the rotational motion of the smart ring 120 as an effective motion, reducing the probability of false triggering of the smart ring 120, improving the experience of a user when using the smart ring 120, and further triggering an interaction event.

In other embodiments, the step of judging whether the rotation motion of the smart ring 120 is a valid rotation motion may further include: transmitting the inertia measurement data to a deep learning network model, wherein the deep learning network model has specific data of effective rotation action; performing feature matching on the inertia measurement data and the specific data; and if the feature similarity of the inertia measurement data and the specific data is high, judging that the rotation motion is effective rotation motion.

Specifically, the inertia measurement data are transmitted to the deep learning network model, a rich original data base is provided for the model, the inertia measurement data are subjected to feature matching with specific data of effective rotation action in the deep learning network model, key features in the inertia measurement data are identified by using the learning and analyzing capability of the model on a large amount of data, if the feature similarity of the inertia measurement data and the specific data is high, the rotation action is judged to be the effective rotation action, the judgment accuracy and reliability are improved, the operation habits and the complex use environments of different users can be better adapted, the robustness of the smart ring 120 interaction method is enhanced, the false triggering probability of the smart ring 120 is reduced, and the experience of the user when the smart ring 120 is used is improved.

As one example, the deep learning network model includes one or more of a recurrent neural network, a long-short term memory network, and a convolutional neural network.

In some embodiment, the rotation motion includes rotation of the smart ring 120 in a single direction.

It should be noted that, the smart ring 120 rotates along a single direction, so that an intuitive and easy-to-understand operation mode is provided for a user, the user can easily grasp how to trigger an interaction event by rotating the smart ring 120, and a complicated operation instruction is not needed, so that the interaction process is natural and smooth, the learning cost and the operation difficulty of the user are reduced, and the user experience is improved.

It should be noted that the motion trajectory of the rotational motion in a single direction is relatively regular and easy to capture, and data features related to the rotational direction are easily and accurately obtained, so that the judgment logic of the rotational motion is simplified, thereby improving the accuracy and efficiency of the judgment and reducing the possibility of erroneous judgment.

In some embodiment, the single direction includes a clockwise direction or a counterclockwise direction.

Referring to FIG. 2, step S3: if the rotation motion of the smart ring 120 is a valid rotation motion, an interaction event is triggered.

It should be noted that, if the rotation motion of the smart ring 120 is an effective rotation motion, an interaction event is triggered, which can reduce the probability of false triggering of the smart ring 120, improve the experience of the user when using the smart ring 120, and provide a new interaction mode for the smart ring 120.

In some embodiment, the interaction event includes switching and controlling a menu item, switching and controlling a function item, or switching and controlling an operation interface.

Specifically, the user may switch menu items upwards or downwards in a menu list of a smart device (e.g., VR display device, AR display device, MR display device, tablet or mobile phone) that establishes a communication connection with the smart ring 120 by rotating the smart ring 120 clockwise or counterclockwise, such as volume adjustment, screen brightness adjustment, progress bar control, etc., clockwise rotation may increase volume, increase brightness, or jump forward progress, and counterclockwise rotation may achieve the opposite effect, and it is not necessary to find a physical key or a virtual control bar on the device, and at the same time, the user may quickly switch between different application interfaces or task windows using the rotation interaction of the smart ring 120, and it is not necessary to operate through a conventional return key, a multi-task key, etc.

In some embodiment, the interaction method of the smart ring 120 may exist simultaneously with the gesture interaction and the key interaction.

It should be noted that the interaction method of the smart ring 120 may exist simultaneously with the gesture interaction and the key interaction, so as to provide a richer and more flexible interaction experience for the user, and meet the requirements of different scenes and user preferences.

The embodiment of the present disclosure further provides a storage medium, storing one or more computer instructions, the one or more computer instructions comprises: acquiring inertial measurement data of the smart ring in real time; judging whether the rotation motion of the smart ring is an effective rotation motion or not based on the inertia measurement data; and, if the rotation motion of the smart ring is an effective rotation motion, triggering an interaction event.

the computer instructions are used to implement the method for interacting the smart ring provided by the embodiment of the present disclosure.

Embodiments of the present disclosure may be implemented by various means, such as hardware, firmware, software, or a combination thereof. In a hardware configuration, the method according to the exemplary embodiments of the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and the like. In a firmware or software configuration, embodiments of the present disclosure may be implemented in the form of Components, procedures, functions, and the like. The software codes may be stored in memory elements and executed by processors. The memory element is located inside or outside the processor, and may transmit and receive data to and from the processor via various known means.

The embodiment of the present disclosure further provides a computer program product, which comprising computer instructions, wherein the computer instructions comprises: acquiring inertial measurement data of the smart ring in real time; judging whether the rotation motion of the smart ring is an effective rotation motion or not based on the inertia measurement data; and, if the rotation motion of the smart ring is an effective rotation motion, triggering an interaction event.

the computer instructions are used to implement the method for interacting the smart ring provided by the embodiment of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

While the disclosed embodiments are disclosed above, the disclosure is not limited thereto. Various changes and modifications may be effected by one skilled in the art without departing from the spirit and scope of the disclosure, and it is intended that the scope of the disclosure be limited only by the terms of the appended claims.

What is claimed is:

1. An interaction method of a smart ring, comprises:

acquiring inertial measurement data of the smart ring in real time;

judging whether the rotation motion of the smart ring is an effective rotation motion or not based on the inertia measurement data; and, if the rotation motion of the smart ring is an effective rotation motion, triggering an interaction event;

wherein the step of judging whether the rotational motion of the smart ring is an effective rotation motion comprises:

based on the inertia measurement data, acquiring a rotation motion center, a rotation motion radius and a rotation motion direction of the smart ring;

judging whether the rotation motion of the smart ring is an effective rotation motion or not based on the rotation motion center, the rotation motion radius and the rotation motion direction;

wherein the step of judging whether the rotational motion of the smart ring is an effective rotation motion based on a rotation motion center, a rotation motion radius, and the rotation motion direction comprises:

comparing the rotation motion center with a three-dimensional center of the smart ring under the rotating motion, comparing the rotation motion radius with the radius of the smart ring, and comparing the rotating motion direction with the tangential direction of the outer wall of the smart ring;

if the rotation motion center with the three-dimensional center of smart ring under rotation motion is unanimous, the rotation motion radius with the radius of smart ring is unanimous, just the rotation motion direction with the tangential direction of smart ring outer wall is unanimous, then deems the rotation motion of smart ring is effective motion.

2. The interaction method of smart ring according to claim 1, wherein the rotation motion comprises rotation of the smart ring in a single direction.

3. The interaction method of smart ring according to claim 2, wherein the single direction comprises a clockwise direction or a counterclockwise direction.

4. The interaction method of smart ring according to claim 1, wherein the interactive event includes switching and controlling of menu items, switching and controlling of function items, or switching and controlling of operation interfaces.

5. The interaction method of smart ring according to claim 1, wherein the smart ring has an inertial measurement unit; the step of acquiring the inertial measurement data of the smart ring in real time comprises the following steps: acquiring inertia measurement data of the smart ring based on the inertia measurement unit.

6. The interaction method of smart ring according to claim 5, wherein the inertial measurement data includes three-axis attitude angle information, angular rate information, and acceleration information.

7. The interaction method of smart ring according to claim 5, wherein the inertial measurement unit includes an acceleration sensor and a gyroscope.

8. The interaction method of smart ring according to claim 1, wherein the interaction method of a smart ring can coexist with gesture interaction and key press interaction.

9. A non-transitory computer-readable medium having stored thereon instructions to configure at least one processor of a smart ring to:

acquire inertial measurement data of the smart ring in real time;

judge whether the rotation motion of the smart ring is an effective rotation motion or not based on the inertia measurement data; and, if the rotation motion of the smart ring is an effective rotation motion, trigger an interaction event;

wherein the judging whether the rotational motion of the smart ring is an effective rotation motion based on a rotation motion center, a rotation motion radius, and the rotation motion direction comprises:

comparing the rotation motion center with a three-dimensional center of the smart ring under the rotating motion, comparing the rotation motion radius with the radius of the smart ring, and comparing the rotating motion direction with the tangential direction of the outer wall of the smart ring;

if the rotation motion center with the three-dimensional center of smart ring under rotation motion is unanimous, the rotation motion radius with the radius of smart ring is unanimous, just the rotation motion direction with the tangential direction of smart ring outer wall is unanimous, then deems the rotation motion of smart ring is effective motion.

10. The non-transitory computer readable medium according to claim 9, wherein the rotation motion comprises rotation of the smart ring in a single direction.

11. The non-transitory computer readable medium according to claim 9, wherein the interactive event includes switching and controlling of menu items, switching and controlling of function items, or switching and controlling of operation interfaces.

12. A smart ring, comprising:

at least one processor; and a non-transitory computer readable medium having stored thereon instructions to configure the at least one processor to:

acquire inertial measurement data of the smart ring in real time;

judge whether the rotation motion of the smart ring is an effective rotation motion or not based on the inertia measurement data; and, if the rotation motion of the smart ring is an effective rotation motion, trigger an interaction event;

wherein the judging whether the rotational motion of the smart ring is an effective rotation motion comprises:

transmitting the inertial measurement data to a deep learning network model having data specific to effective rotation motion; performing feature matching on the inertial measurement data and the specific data; and if the feature similarity of the inertia measurement data and the specific data is high, judging that the rotation motion is an effective rotation motion.

* * * * *